US011268485B2

(12) United States Patent
Munoz et al.

(10) Patent No.: US 11,268,485 B2
(45) Date of Patent: Mar. 8, 2022

(54) FUEL PUMP WITH INDEPENDENT PLUNGER COVER AND SEAL

(71) Applicant: Cummins Inc., Columbus, IN (US)

(72) Inventors: Roberto Medina Munoz, Columbus, IN (US); Matthew B. State, Indianapolis, IN (US); Samuel David Griffith Magnuson, Columbus, IN (US); Thomas M. Yeager, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/989,855

(22) Filed: Aug. 10, 2020

(65) Prior Publication Data

US 2020/0370525 A1 Nov. 26, 2020

Related U.S. Application Data

(63) Continuation of application No. PCT/US2018/017954, filed on Feb. 13, 2018.

(51) Int. Cl.
*F02M 59/44* (2006.01)
*F02M 59/02* (2006.01)
(Continued)

(52) U.S. Cl.
CPC ........ *F02M 59/442* (2013.01); *F02M 37/043* (2013.01); *F02M 59/025* (2013.01);
(Continued)

(58) Field of Classification Search
CPC .... F02M 59/442; F02M 59/025; F02M 59/48; F02M 59/102; F02M 37/043; F16J 9/061; F16J 15/3232
(Continued)

(56) References Cited

U.S. PATENT DOCUMENTS 2,185,146 A 12/1939 Edwards
2,975,776 A * 3/1961 Nicolls ................ F02M 59/48
123/495
(Continued)

FOREIGN PATENT DOCUMENTS

EP 3150842 A1 4/2017
WO 2015000654 A1 1/2015
WO 2016182572 A1 11/2016

OTHER PUBLICATIONS

International Search Report; International Searching Authority; International Application No. PCT/US2018/017954; dated Aug. 27, 2020; 9 pages.
(Continued)

*Primary Examiner* — Mahmoud Gimie
(74) *Attorney, Agent, or Firm* — Taft Stettinius & Hollister LLP (57) ABSTRACT

A fuel pump for an internal combustion engine comprising a barrel having a longitudinal axis that spans between a proximal end and a distal end and a central bore therein. A plunger is disposed at least partially in the central bore and is configured to move along the longitudinal axis. An annular seal assembly is arranged around the circumference of the plunger wherein the annular seal assembly includes a seal retainer housing and a first seal and the seal retainer housing also retains the proximal end of the barrel thereon to form a second seal wherein the first and the second seals reduce the fuel to oil transfer rate and the oil to fuel transfer rate. The plunger and barrel are configured to be removed from and re-assembled with the annular seal assembly to enable service of these parts and the fuel pump.

24 Claims, 6 Drawing Sheets

(51) Int. Cl.
    *F16J 9/06*           (2006.01)
    *F02M 59/10*         (2006.01)
    *F02M 59/48*         (2006.01)
    *F16J 15/3232*      (2016.01)
    *F02M 37/04*         (2006.01)

(52) U.S. Cl.
    CPC .......... *F02M 59/102* (2013.01); *F02M 59/48* (2013.01); *F16J 9/061* (2013.01); *F16J 15/3232* (2013.01)

(58) Field of Classification Search
    USPC .................................................. 123/506, 508
    See application file for complete search history.

(56) References Cited

U.S. PATENT DOCUMENTS

| | | |
|---|---|---|
| 4,394,962 A | 7/1983 | Wilber |
| 4,403,586 A | 9/1983 | Taniguchi |
| 5,285,756 A | 2/1994 | Squires |
| 5,979,789 A | 11/1999 | Sullivan et al. |
| 6,293,254 B1 | 9/2001 | Crofts et al. |
| 6,619,186 B2 * | 9/2003 | Duquette ............ F02M 59/102 123/502 |
| 7,509,947 B2 * | 3/2009 | Tansug ................ F02M 59/102 123/446 |
| 7,665,976 B2 | 2/2010 | Usui et al. |
| 8,495,987 B2 | 7/2013 | Lucas et al. |
| 9,074,474 B2 | 7/2015 | Maier et al. |
| 9,151,289 B2 | 10/2015 | Crofts et al. |
| 2011/0303195 A1 | 12/2011 | Lucas et al. |
| 2015/0017035 A1 | 1/2015 | McCrindle |
| 2015/0369190 A1 * | 12/2015 | Ropertz ................ F04B 53/143 417/437 |
| 2016/0377042 A1 * | 12/2016 | McCrindle ........... F02M 59/442 92/86 |
| 2018/0135581 A1 * | 5/2018 | Usui ...................... F02M 69/02 |

OTHER PUBLICATIONS

International Search Report; International Searching Authority; International Application No. PCT/US2018/017954; dated Apr. 26, 2018; 2 pages.
Written Opinion of the International Searching Authority; International Searching Authority; International Application No. PCT/US2018/017954; dated Apr. 26, 2018; 8 pages.

* cited by examiner

FUEL PUMP WITH INDEPENDENT PLUNGER COVER AND SEAL

CROSS-REFERENCE TO RELATED APPLICATION

The present application is a continuation of International Patent Application No. PCT/US2018/017954 filed on Feb. 13, 2018, which is incorporated herein by reference.

BACKGROUND

The present disclosure relates to a common rail multi-cylinder fuel pump for an internal combustion engine, and more particularly, but not exclusively, relates to a seal assembly to reduce the fuel to oil transfer rate, the oil to fuel transfer rate, and to enable serviceability of the pumping elements.

High pressure fuel pumps have become a common solution for generating high pressure fuel in common rails utilized in direct injection internal combustion engines. Fuel pumps typically include pumping elements that comprise a plunger reciprocating within a pumping bore formed by a pumping sleeve inner wall. These fuel pumps are typically driven by a tappet mounted adjacent to a cam for cyclically pushing on the actuated end of the plunger. The plunger's reciprocating motion is typically accomplished with a mechanism that moves the plunger with a rotating cam. The plunger extends from a first extremity slidably arranged in the pumping bore of the pump head where the fuel is pumped, to a second extremity cooperating with the cam that is lubricated by oil.

A clearance on the order of a few micrometers is provided between the plunger and the plunger sleeve inner wall to enable the plunger to slide therein. Upon fuel injection, if fuel in a fuel pressurization chamber is pressurized, the fuel may leak from the clearance into the cavity of the housing that contains oil for lubrication of the cam and spring. This is often referred to as the fuel to oil transfer rate. Similarly, oil may leak from the cavity of the housing through the clearance into the pump head to mix with the fuel. This is typically referred to as the oil to fuel transfer rate. As the fuel to oil transfer rate increases, the useful life of the oil filter decreases as more fuel is mixed with and contaminates the oil. As the oil to fuel transfer rate increases, the combustibility of the fuel decreases as more oil is mixed with the fuel.

Thus, there is a continuing demand for further contributions in this area of technology.

SUMMARY

Certain embodiments of the present application include unique systems and apparatus of a fuel pump structured to facilitate the pumping of fuel into a common fuel rail of a fuel system of an internal combustion engine wherein the common fuel rail supplies pressurized fuel to one or more fuel injectors during operation of the internal combustion engine. The fuel pump includes a barrel, a plunger partially disposed in the barrel, and an annular seal assembly arranged around the circumference of the plunger to limit the transfer rate between oil and fuel or fuel and oil or liquids in the central bore and liquids in the tappet bore. The fuel pump is also configured such that the barrel and plunger can be removed from the annular seal assembly to service the seal assembly and the fuel pump. The annular seal assembly attached to the plunger and barrel functions as a stop mechanism for assembly of first and second coil springs therewith. The housing in the annular seal assembly functions as a thermal shield and may contribute to reduce fluid transfer between the central bore and the tappet bore. A pressure control feature in the housing may be included in the annular seal assembly.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Figure 1:
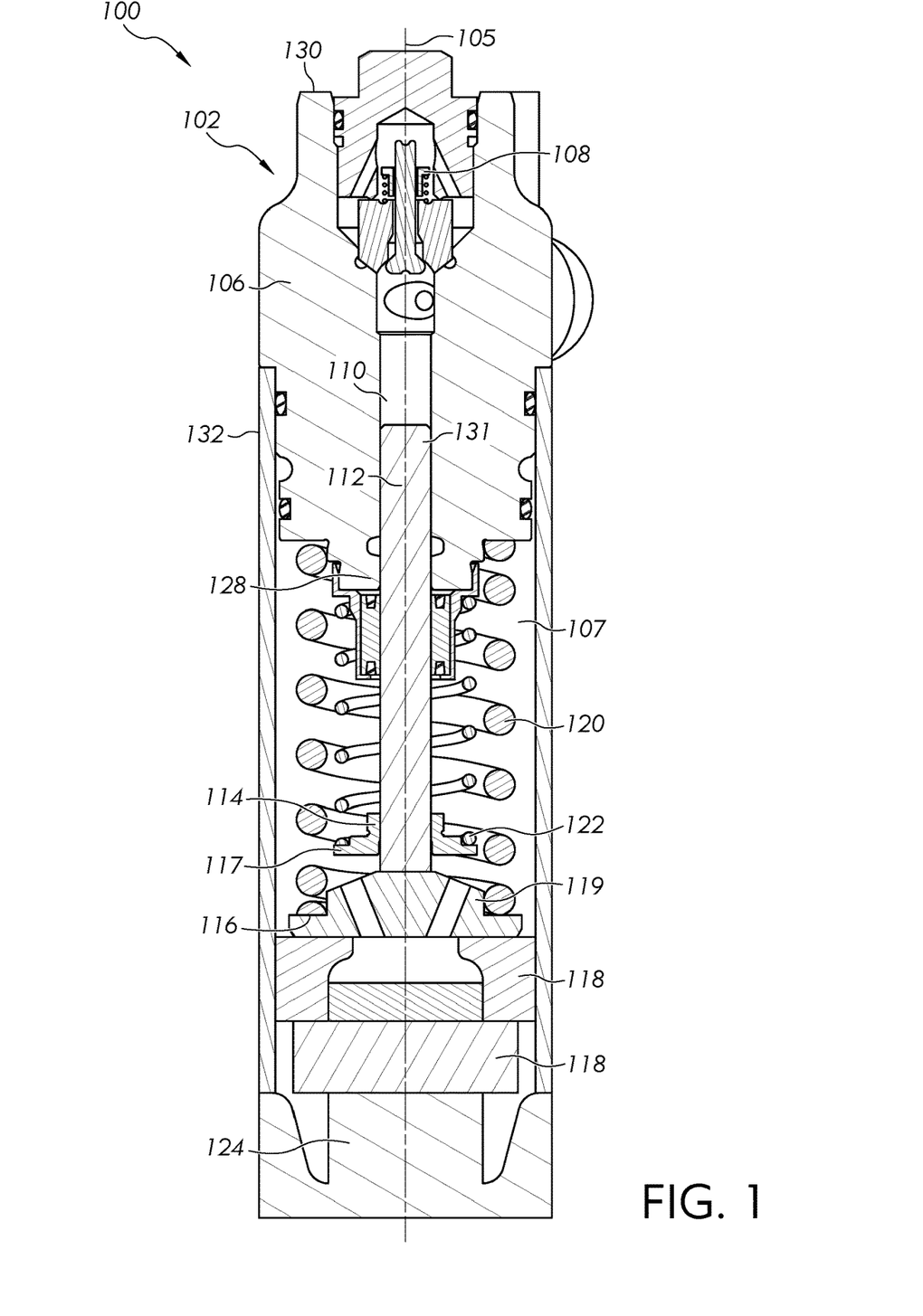
FIG. 1 is a cross-sectional view of an exemplary pumping element according to the present disclosure.

With reference to FIG. 1 is a cross-sectional view of exemplary pumping elements according to the present disclosure. Fuel pump 100 includes a pumping element 102. Although a single pumping element is shown, in various alternative embodiments of the present disclosure fuel pump 100 may include multiple pumping elements configured to operate simultaneously to pump pressurized fuel to a fuel rail or accumulator of an internal combustion engine.

Pumping element 102 is arranged within the fuel pump 100 and structured to facilitate the pumping of fuel into a common fuel rail (not shown) of a fuel system of an internal combustion engine (not shown) wherein the common fuel rail supplies pressurized fuel to one or more fuel injectors (not shown) during operation of the internal combustion engine.

Pumping element 102 includes a barrel 106, tappet bore 107, inlet check valve 108, central bore 110, plunger 112, extender element 114, spring retainer 116, tappet assembly 118, tappet return spring or first coil spring 120, plunger return spring or second coil spring 122, cam lobe 124, an annular seal assembly 126, and a vent hole (not illustrated). Barrel 106 includes a distal end 130 opposite a proximal end 128. Barrel 106 also includes a central bore 110 disposed centrally along a longitudinal axis 105 thereof. Plunger 112 includes a distal end 131 opposite a proximal end 133. Plunger 112 is disposed within the central bore 110 and structured for reciprocal movement therein. The plunger 112 may be substantially but not completely disposed within central bore 110 so that during reciprocal movement within central bore 110, at least a portion of plunger 112 extends outside of central bore 110. The diametrical clearance between the central bore 110 and the plunger 112 is between about 0.2 to 0.5 microns. The plunger 112 is movable between a pumping stroke and a filling stroke (not illustrated). In the illustrative embodiment of FIG. 1, plunger 112 is shown in a pumping stroke position. Barrel 106 further includes an inlet check valve 108 disposed generally longitudinally above plunger 112. Inlet check valve 108 is configured to permit low pressure inlet fuel to enter pumping element 102 at a filling pressure of approximately 150 pounds per square inch (psi) or other appropriate filling pressure.

In one configuration wherein the plunger 112 is in a filling stroke position, the inlet check valve 108 permits pressurized inlet fuel to fill central bore 110 so that the pressurized fuel fills a volume of space defined at one end by plunger 112. Longitudinal movement of the plunger 112 away from the cam lobe 124 causes compression or pressurization of fuel in the central bore 110 and creates a pressure stroke or a pumping stroke causing fuel to exit pumping element 102 whereas longitudinal movement of plunger 112 toward cam lobe 124 causes fuel flow into central bore 110, via inlet check valve 108, and creates an intake stroke which corresponds to a filling stroke. Extender element 114, spring retainer 116, tappet assembly 118, first coil spring 120, second coil spring 122, cam lobe 124, and annular seal assembly 126 are each housed within tappet bore 107 formed by housing 132 and are each disposed substantially longitudinally below barrel 106.

In one form, spring retainer 116 is spaced apart from the barrel 106 and includes a guide diameter 119 configured to engage a portion of the first coil spring 120 such that a coil at one end of the first coil spring 120 may be disposed directly adjacent guide diameter 119 of spring retainer 116. Guide diameter 119 includes an outer wall having an outer surface that engages a portion of the first coil spring 120. In one form, extender element 114 is coupled to plunger 112 and includes a guide diameter 117 structured to engage a portion of the second coil spring 122 such that a coil at one end of second coil spring 122 may be disposed directly adjacent guide diameter 117 of extender element 114. Guide diameter 117 and guide diameter 119 may be structured to have a specific fit to a first coil at one end of second coil spring 122 and first coil spring 120, respectively. For example, guide diameter 117 may be equal to the spring inner diameter of second coil spring 122 via an interference fit. As such, a first coil at one end of the second coil spring 122 may be engaged onto a guide diameter 117 that is slip or interference fit onto the first coil. In some forms, first coil spring 120 may provide a much larger spring force than second coil spring 122. In one form, first coil spring 120 provides a spring force that is approximately ten to twenty times larger than the spring force of the second coil spring 122.

Plunger 112 is driven in part by second coil spring 122 cooperating with tappet assembly 118 to reciprocate plunger 112 within tappet bore 107 thereby causing plunger 112 to move between an extended position and a retracted position during a filling stroke and a pumping stroke, respectively. The second coil spring 122 applies a return force to plunger 112 via extender element 114 to urge plunger 112 toward the extended position and into engagement with spring retainer 116 and tappet assembly 118. During normal operation of pumping element 102, the first coil spring 120 causes spring retainer 116 to contact tappet assembly 118 as tappet assembly 118 moves in response to the rotation of the camshaft and its cam lobe 124. As illustrated in FIG. 1, plunger 112 of pumping element 102 is in the extended position.

Figure 2:
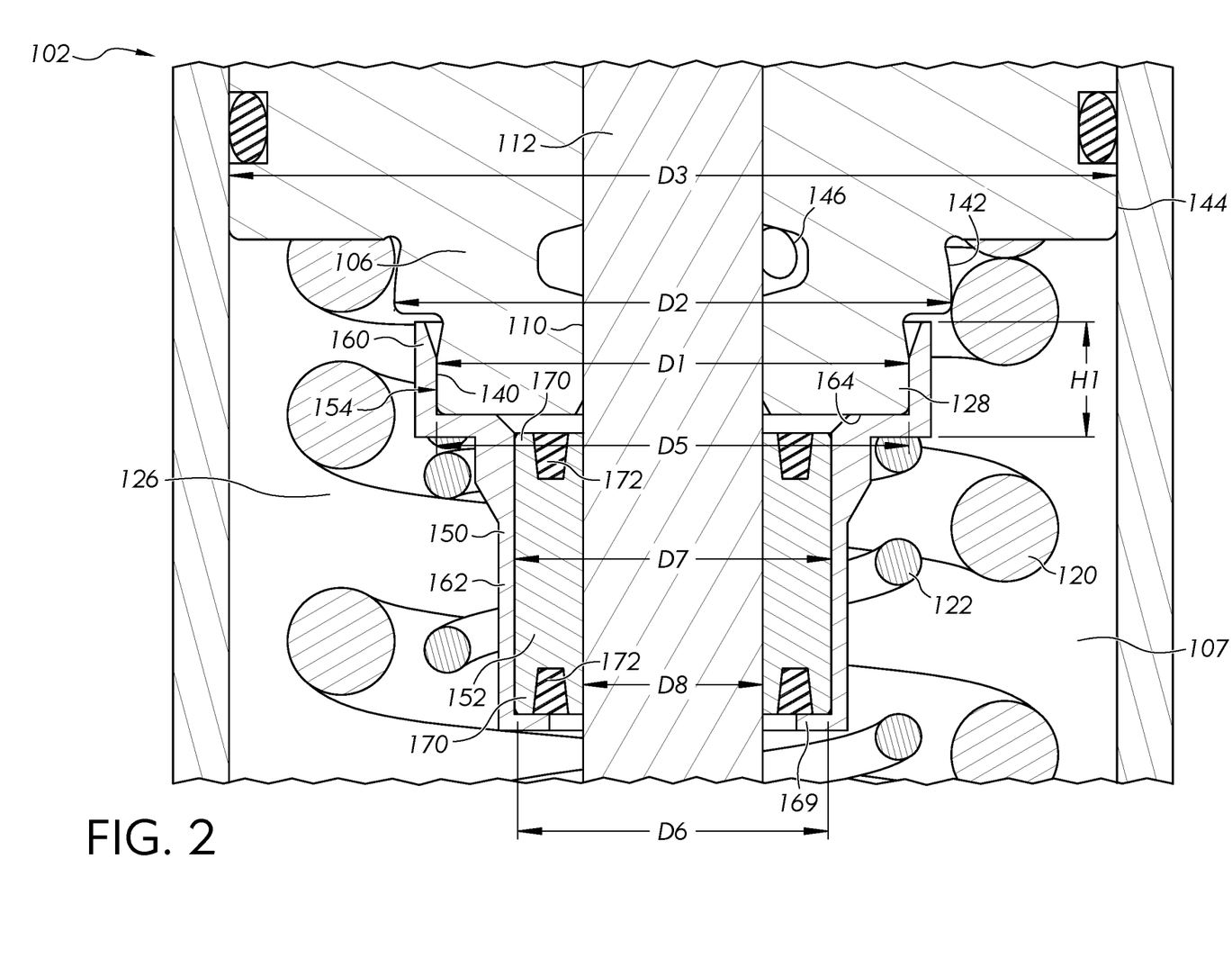
FIG. 2 is an enlarged partial cross-sectional view of the pumping element of FIG. 1.

FIG. 2 shows an enlarged partial cross-sectional view of pumping element 102 and in particular the annular seal assembly 126. Also illustrated is barrel 106 having the proximal end 128, a first barrel section 140, a second barrel section 142, a third barrel section 144, and optionally a fuel-drain port 146. The proximal end 128 includes the first barrel section 140 having a first diameter D1, the second barrel section 142 having a second diameter D2, and the third barrel section 144 having a third diameter D3. Diameter D2 is greater than diameter D1, and diameter D3 is greater than diameter D2. The first barrel section 140 is configured to receive a seal retainer housing 150 as described in more detail below. The second barrel section 142 is configured to receive the first coil spring 120 such that at least one coil of the first coil spring 120 contacts the third barrel section 144 and the at least one coil of the first coil spring 120 is retained on the second barrel section 142. The fuel drain port 146 is configured to drain excess pressurized fuel to a fuel tank of an internal combustion engine during operation of the pumping element 102 if the fuel has leaked into the space between the plunger 112 and the central bore 110.

The annular seal assembly 126 is arranged around the circumference of the plunger 112. The annular seal assembly 126 includes a seal retainer housing 150 and a seal 152 configured to prevent oil in the tappet bore 107 from movement into the central bore 110 of the barrel 106. The seal retainer housing 150 is configured to retain the proximal end 128 of the barrel 106 thereon such that the proximal end 128 of the barrel 106 forms a seal 154 with the seal retainer housing 150 to prevent fuel in the central bore 110 from movement into the tappet bore 107. In the illustrated form, the seal retainer housing 150 has a first cylindrical wall 160 that extends from a second cylindrical wall 162 with a substantially horizontal wall 164 that spans between the first cylindrical wall 160 and the second cylindrical wall 162. The first cylindrical wall 160 has an inner diameter D5 that is the same size or is slightly smaller than the first diameter D1 of the first barrel section 140 to compress and retain the first barrel section 140 therein. In the illustrated embodiment, the first barrel section 140 of the barrel 106 and the first cylindrical wall 160 are sized and configured to form an interference or press fit connection. The first barrel section 140 can be engaged and fixed to the first cylindrical wall 160 and the horizontal wall 164 by crimping, screwing, gluing or any other techniques. The first cylindrical wall 160 has a height H1 that extends towards but does not contact the second barrel section 142. In some forms, the first cylindrical wall 160 extends towards and contacts the second barrel section 142. The second cylindrical wall 162 is sized to receive and retain the seal 152 therein. The second cylindrical wall 162 has an inner diameter D6 that is sized to receive the seal 152 therein. The inner diameter D5 is larger than the inner diameter D6 of the second cylindrical wall 162. In the illustrated form, the seal retainer housing 150 includes an end portion 169 arranged to extend from second cylindrical wall 162 and retain the seal 152 therein however the end portion 169 is not required to retain the seal 152 therein. The second cylindrical wall 162 and the horizontal wall 164 are configured to receive the second coil spring 122 such that at least one coil of the second coil spring 122 contacts the horizontal wall 164 and/or the second cylindrical wall 162 and the at least one coil of the second coil spring 122 is retained on the second cylindrical wall 162.

The seal 152 is a double lip seal that is arranged to circumferentially contact the plunger 112. In other forms the seal 152 may be configured differently. The seal 152 includes an outer diameter D7 that is sized and configured to fit in the second cylindrical wall 162 and an inner diameter D8 that is sized to receive the plunger 112 therein. The seal 152 includes a pair of lip seals 170 wherein each of the lip seals 170 includes a spring 172 that is configured to load the lip seals 170 and hold the seal 152 onto the circumference of the plunger 112. The seal 152 including the lip seals 170 is configured to prevent fuel or other fluid from the central bore 110 from leaking or transferring into the tappet bore 107 to mix with the oil therein and/or to prevent oil or other fluid from leaking or transferring from the tappet bore 107 into the central bore 110 to mix with the fuel therein. The seal 152 may include a polytetrafluoroethylene coating on the outer surface of the seal 152 in some forms.

During the assembly process the plunger 112 is assembled with the barrel 106 or with the annular seal assembly 126 in any order. In one form of assembly, the plunger 112 is first inserted into the annular seal assembly 126. Next, the central bore 110 at the proximal end 128 of the barrel 106 is assembled onto the distal end 131 of the plunger 112 until the first barrel section 140 of the barrel 106 is adjacent to the horizontal wall 164 in a press fit connection. Alternatively, the barrel 106 is first assembled onto the plunger 112 and then the proximal end 133 of the plunger 112 is inserted into the annular seal assembly 126 until the first barrel section 140 of the barrel 106 is adjacent to the horizontal wall 164. The first coil spring 120 and the second coil spring 122 are assembled with the second barrel section 142 and the annular seal assembly 126, respectively. Thereafter the assembled plunger 112, barrel 106, annular seal assembly 126, first coil spring 120, and second coil spring 122 are inserted into and assembled with the housing 132.

Figure 3:
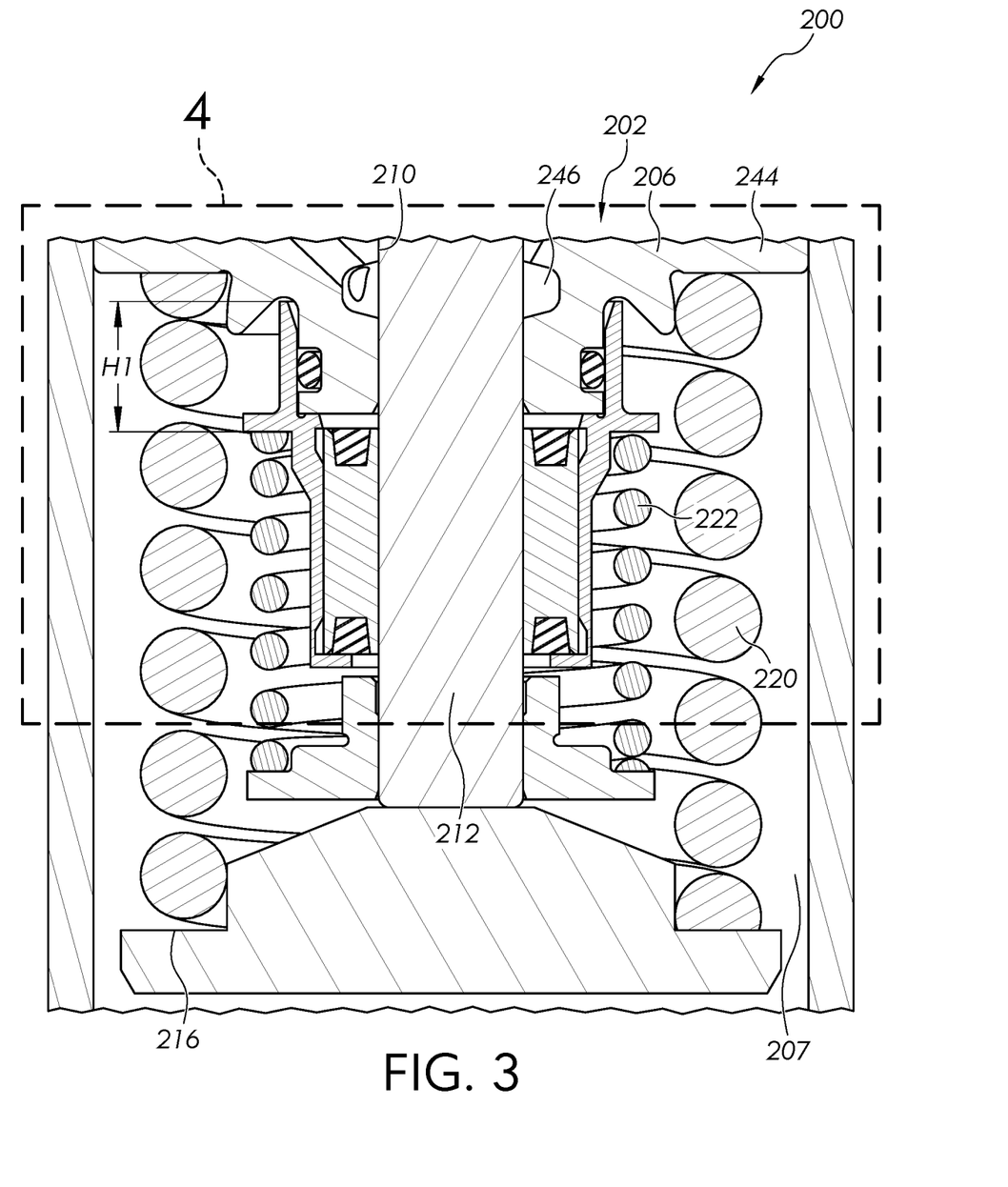
FIG. 3 is a partial cross-sectional view of another exemplary pumping element according to the present disclosure.
Figure 4:
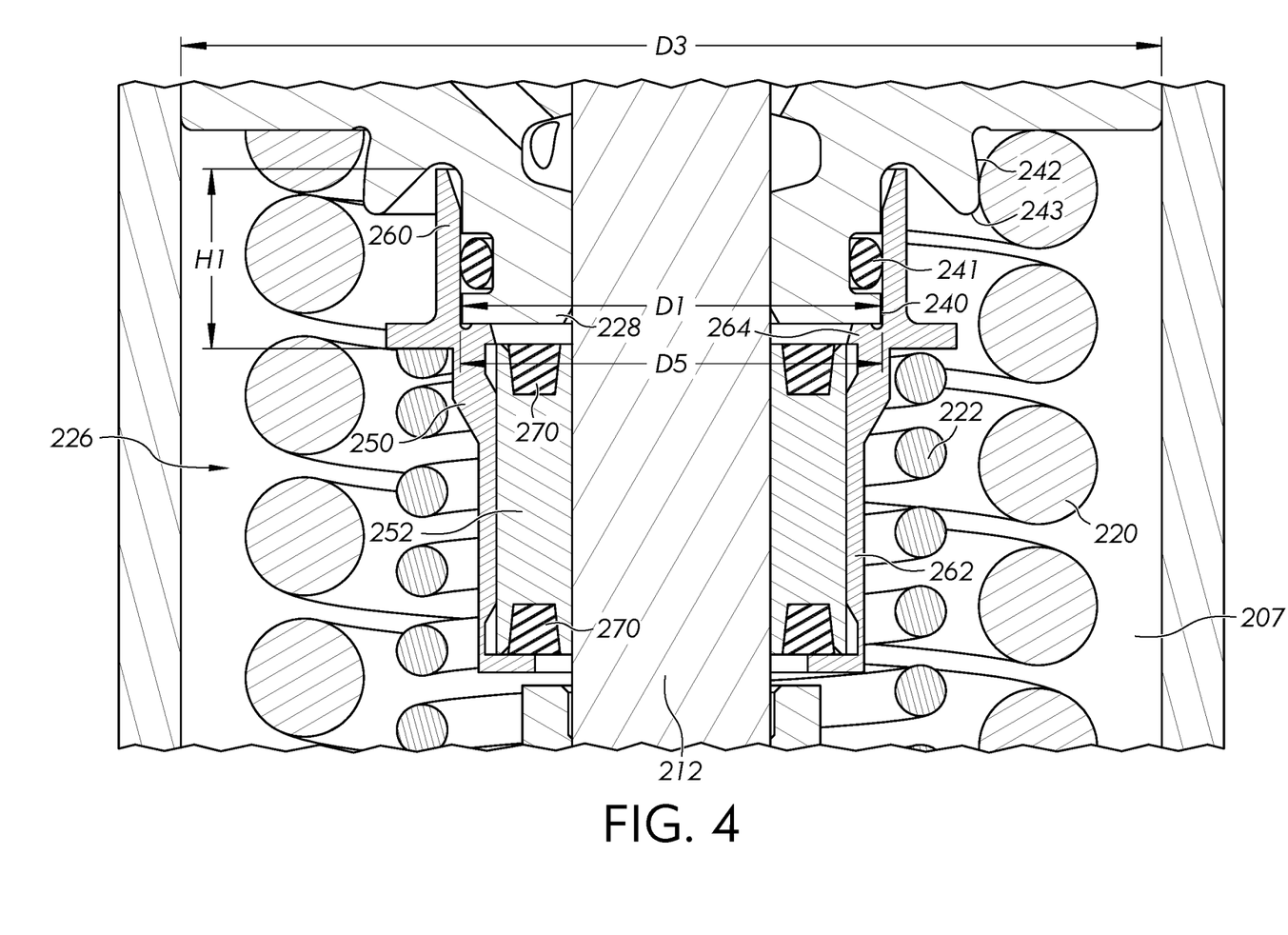
FIG. 4 is an enlarged partial cross-sectional view of the pumping element of FIG. 3.

With reference to FIGS. 3 and 4, there is an enlarged cross-sectional view of a fuel pump 200 according to the present disclosure that is similar to the fuel pump 100 described above. As such, the same reference numbers are used in the description of components which are identical between the fuel pump 200 and the fuel pump 100. As such, a description of the components of the fuel pump 100 that have a corresponding identical component within fuel pump 200 will apply as a description of the corresponding identical component. For example, a description of component 1xx within fuel pump 100 will likewise apply as a description of component 2xx within fuel pump 200 unless noted otherwise.

Fuel pump 200 includes a pumping element 202. Pumping element 202 includes a barrel 206, tappet bore 207, inlet check valve (not illustrated), central bore 210, plunger 212, extender element (not illustrated), spring retainer 216, tappet assembly (not illustrated), tappet return spring or first coil spring 220, plunger return spring or second coil spring 222, cam lobe (not illustrated), an annular seal assembly 226, an elastomeric seal 241, and a vent hole (not illustrated).

Pumping element 202 includes substantially the same components as pumping element 102. Barrel 206 has a proximal end 228, a first barrel section 240, a second barrel section 242, a third barrel section 244, and optionally a fuel-drain port 246. The proximal end 228 includes the first barrel section 240 having a first diameter D1 and the third barrel section 244 having a third diameter D3. Diameter D3 is greater than diameter D1. The first barrel section 240 is configured to receive the elastomeric seal or O-ring 241. The elastomeric seal 241 is configured to retain the barrel 206 and the seal retainer housing 250 on the plunger 212 during assembly. The second barrel section 242 has an extender portion 243 configured to receive the first coil spring 220 such that at least one coil of the first coil spring 220 contacts the third barrel section 244 and the at least one coil of the first coil spring 220 is retained on the second barrel section 242. The extender portion 243 extends over a portion of a first cylindrical wall 260 but may be configured differently in other forms.

The annular seal assembly 226 is substantially similar to annular seal assembly 126. The annular seal assembly 226 is arranged around the circumference of the plunger 212. The annular seal assembly 226 includes a seal retainer housing 250 and a seal 252 configured to prevent oil in the tappet bore 207 from movement into the central bore 210 of the barrel 206. In the illustrated form, the seal retainer housing 250 has a first cylindrical wall 260 that extends from a second cylindrical wall 262 with a substantially horizontal wall 264 that spans between the first cylindrical wall 260 and the second cylindrical wall 222. The first cylindrical wall 260 has an inner diameter D5 that is the same size or about the same size as the first diameter D1 of the first barrel section 240. In the illustrated embodiment, the first barrel section 240 of the barrel 206 and the first cylindrical wall 260 are sized and configured to receive the elastomeric seal 241. The first cylindrical wall 260 has a height H1 that extends towards and contacts the second barrel section 242. Alternatively, the first cylindrical wall 260 may not contact the second barrel section 242 in other embodiments. The height H1 of the first cylindrical wall 260 may be larger than the height H1 of the first cylindrical wall 160. The second cylindrical wall 262 is sized to receive and retain the seal 252 therein similar to the second cylindrical wall 162 and seal 152.

During the assembly process the plunger 212 is assembled with the barrel 206 or with the annular seal assembly 226 in any order. In one form of assembly, the plunger 212 is first inserted into the annular seal assembly 226. Next, the central bore 210 at the proximal end 228 of the barrel 206 with the elastomeric seal 241 attached thereon is assembled onto the distal end 231 of the plunger 212 until the first barrel section 240 of the barrel 206 is adjacent to the horizontal wall 264. Alternatively, the barrel 206 and the elastomeric seal 241 are first assembled onto the plunger 212 and then the proximal end 233 of the plunger 212 is inserted into the annular seal assembly 226 until the first barrel section 240 of the barrel 206 is adjacent to the horizontal wall 264. The first coil spring 220 and the second coil spring 222 are assembled with the second barrel section 242 and the annular seal assembly 226, respectively. Thereafter the assembled plunger 212, barrel 206, elastomeric seal 241, annular seal assembly 226, first coil spring 220, and second coil spring 222 are inserted into and assembled with the housing 232.

Figure 5:
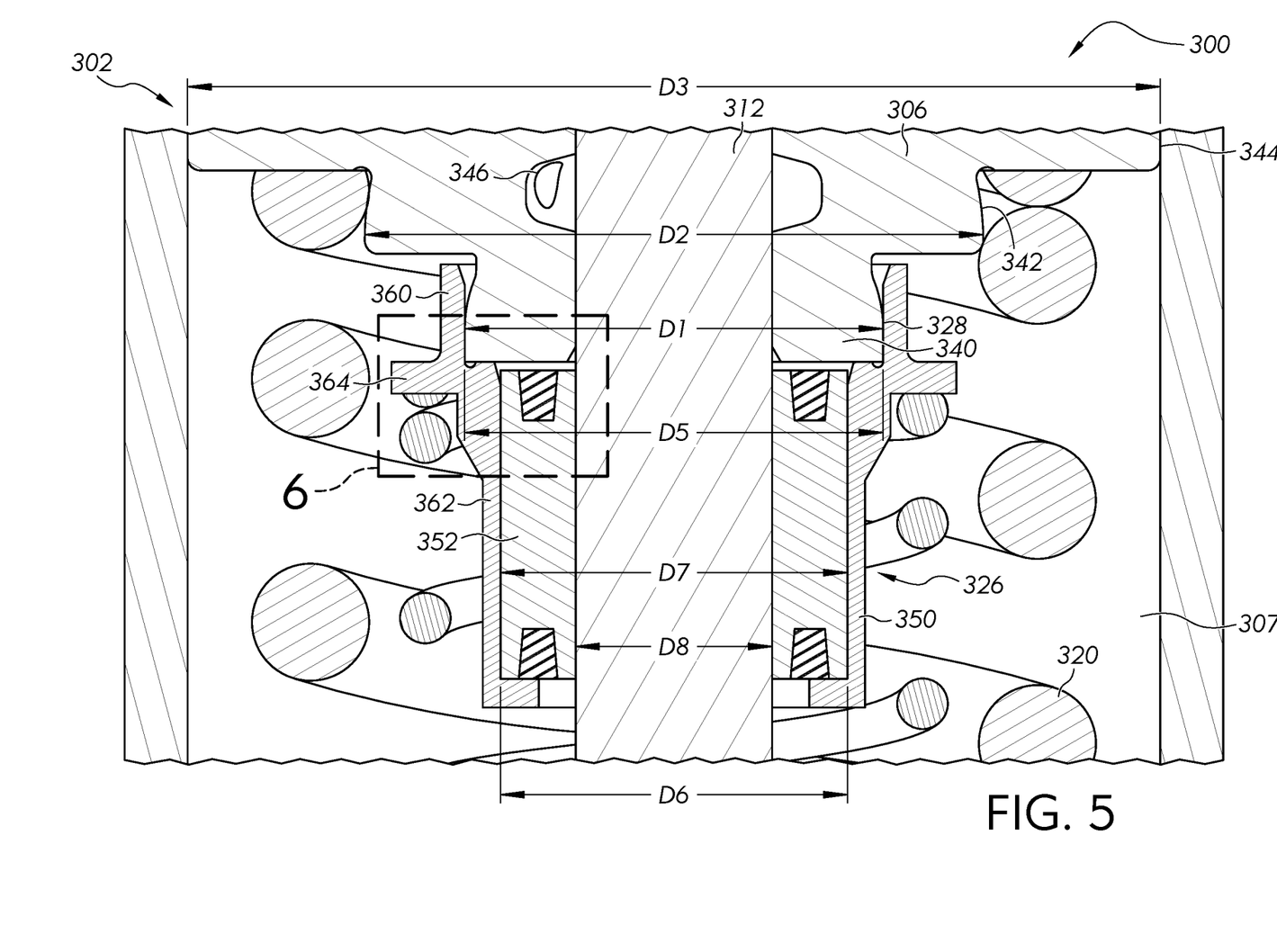
FIG. 5 is an enlarged partial cross-sectional view of another exemplary pumping element according to the present disclosure.
Figure 6:
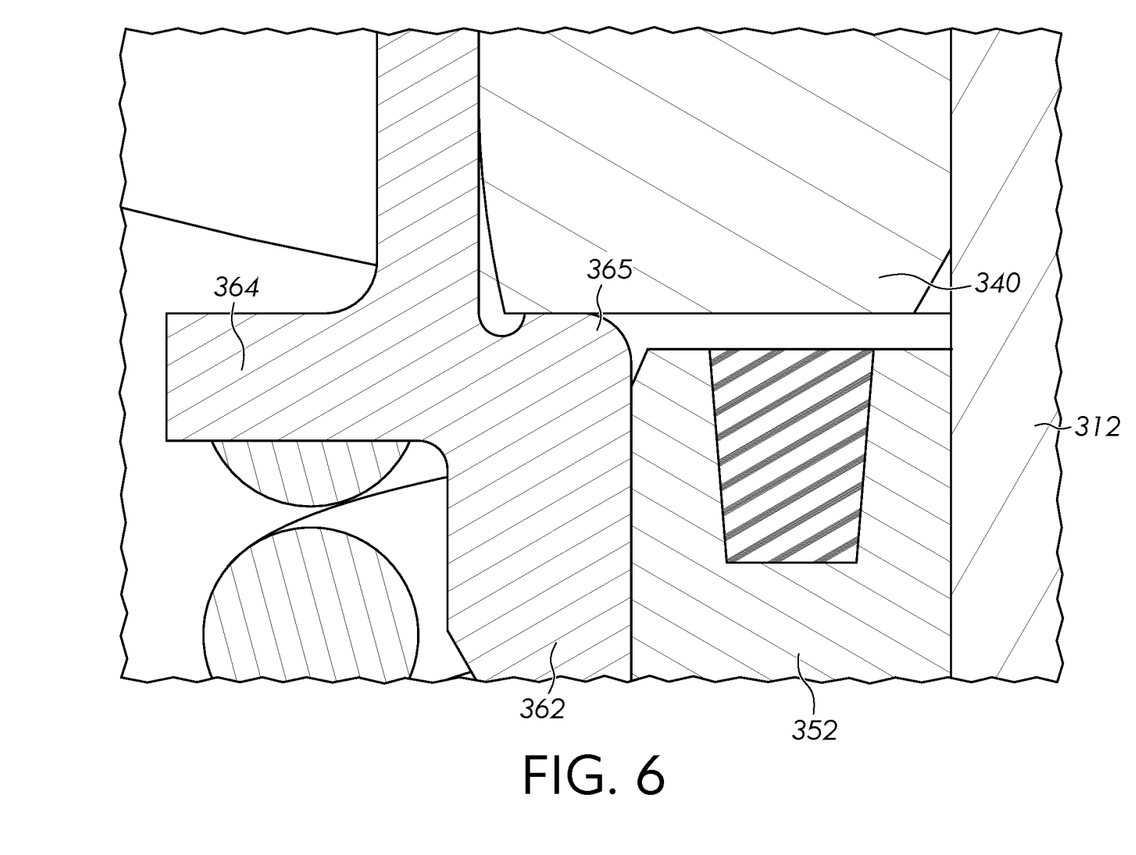
FIG. 6 is an enlarged partial cross-sectional view of the pumping element of FIG. 5.

With reference to FIGS. 5 and 6, there is an enlarged cross-sectional view of a fuel pump 300 according to the present disclosure that is similar to the fuel pump 100 described above. As such, the same reference numbers are used in the description of components which are identical between the fuel pump 300 and the fuel pump 100. As such, a description of the components of the fuel pump 100 that have a corresponding identical component within fuel pump 300 will apply as a description of the corresponding identical component. For example, a description of component 1xx within fuel pump 100 will likewise apply as a description of component 3xx within fuel pump 300 unless noted otherwise.

Fuel pump 300 includes a pumping element 302. Pumping element 302 includes a barrel 306, tappet bore 307, inlet check valve (not illustrated), central bore (not illustrated), plunger 312, extender element (not illustrated), spring retainer (not illustrated), tappet assembly (not illustrated), tappet return spring or first coil spring 320, plunger return spring or second coil spring 322, cam lobe (not illustrated), an annular seal assembly 326, and a vent hole (not illustrated).

Pumping element 302 includes substantially the same components as pumping element 102. Barrel 306 has a proximal end 328, a first barrel section 340, a second barrel section 342, a third barrel section 344, and optionally a fuel-drain port 346. Barrel 306 is similar to barrel 106.

The annular seal assembly 326 is substantially similar to annular seal assembly 126. The annular seal assembly 326 is arranged around the circumference of the plunger 312. The annular seal assembly 326 includes a seal retainer housing 350 and a seal 352 configured to prevent oil in the tappet bore 307 from movement into the central bore of the barrel 306. In the illustrated form, the seal retainer housing 350 has a first cylindrical wall 360 that extends from a second cylindrical wall 362 with a substantially horizontal wall 364 that spans between the first cylindrical wall 360 and the second cylindrical wall 362. The first cylindrical wall 360 has an inner diameter D5 that is the same size or is slightly smaller than the first diameter D1 of the first barrel section 340 to compress and retain the first barrel section 340 therein. In the illustrated embodiment, the first barrel section 340 of the barrel 306 and the first cylindrical wall 360 are sized and configured to form an interference or press fit connection as described above. The first cylindrical wall 360 is similar to the first cylindrical wall 160 described above. The second cylindrical wall 362 is sized to receive and retain the seal 352 therein. The second cylindrical wall 362 has an inner diameter D6 that is sized to receive the seal 352 therein. The inner diameter D5 is larger than the inner diameter D6 of the second cylindrical wall 362. In the illustrated form, the seal retainer housing 350 includes an end portion 369 similar to the end portion 169. The second cylindrical wall 362 and the horizontal wall 364 are configured to receive the second coil spring 322 such that at least one coil of the second coil spring 322 contacts the horizontal wall 364 and/or the second cylindrical wall 362 and the at least one coil of the second coil spring 322 is retained on the second cylindrical wall 362. The horizontal wall 364 includes a pressure control feature 365 that engages the first barrel section 340 of the barrel 306 to form a gap or space between the first barrel section 340 and the seal 352. The pressure control feature 365 will reduce or limit the amount of pressure between the annular seal assembly 326, the plunger 312, and the barrel 306. The pressure control feature 362 is illustrated as a nub or protrusion that extends away from the horizontal wall 364 towards the first barrel section 340 of the barrel 306.

The seal 352 is a double lip seal that is arranged to circumferentially contact the plunger 112 and is similar to the seal 152.

Beneficially, fuel pumps 100, 200, and 300 do not require a cooling circuit nor a drain circuit to handle leakage since the oil to fuel transfer rate and the fuel to oil transfer rate is very low. Also beneficially the annular seal assemblies 126, 226, and 326 attached to the plungers 112, 212, and 312, respectively, act as a stop mechanism for assembly with the second coil springs 122, 222, and 322. Moreover, the barrels 106, 206, and 306, and the plungers 112, 212, and 312 are removable from the respective annular seal assemblies 126, 226, and 326, to service the annular seal assemblies 126, 226, and 326.

Various aspects of the present disclosure are contemplated as described in the claims. According to one aspect, a fuel pump comprising a barrel having a longitudinal axis that spans between a proximal end and a distal end, the barrel including a central bore along the longitudinal axis; a plunger disposed at least partially in the central bore, the plunger configured to move along the longitudinal axis; an annular seal assembly arranged around the circumference of the plunger, the annular seal assembly including a seal retainer housing and a first seal, the seal retainer housing is configured to retain the proximal end of the barrel thereon such that the proximal end of the barrel forms a second seal with the seal retainer housing; and a coil spring having a proximal end opposite a distal end, wherein the proximal end is assembled with the plunger and the distal end is assembled with the annular seal assembly to urge the annular seal assembly towards the barrel.

According to another aspect, the first seal is configured to prevent fluid in the tappet bore from movement into the central bore of the barrel, and the second seal is configured to prevent fluid in the central bore from movement into the tappet bore.

According to another aspect, the fuel pump further comprises a second coil spring having a proximal end opposite a distal end, wherein the distal end is retained on the barrel.

According to another aspect, the annular seal assembly is configured to be removed from the plunger and re-assembled with the plunger.

According to another aspect, the seal retainer housing has a first cylindrical wall that extends from a second cylindrical wall, the first cylindrical wall has a larger diameter than the diameter of the second cylindrical wall, the first cylindrical wall is configured to receive and retain the proximal end of the barrel therein, and the second cylindrical wall is configured to receive and retain the first seal therein. According to a further aspect, the proximal end of the barrel is coupled to the first cylindrical wall by an interference fit.

According to another aspect, the first seal includes a first lip seal spaced opposite a second lip seal. According to a further aspect, the seal includes a first spring associated with the first lip seal, and the seal includes a second spring associated with the second lip seal.

According to another aspect, the first seal comprises a polytetrafluoroethylene material.

According to another aspect, the fuel pump further comprises an elastomeric seal positioned between the proximal end of the barrel and the annular seal assembly.

According to a second aspect, a fuel pump comprises a barrel having a longitudinal axis that spans between a proximal end and a distal end, the barrel including a central bore along the longitudinal axis; a plunger disposed at least partially in the central bore, the plunger configured to move along the longitudinal axis; and an annular seal assembly arranged around the circumference of the plunger, the annular seal assembly including a seal retainer housing and a first seal, the seal retainer housing is configured to retain the proximal end of the barrel thereon such that the proximal end of the barrel forms a second seal with the seal retainer housing, the annular seal assembly is configured to be removed from the plunger and re-assembled with the plunger.

According to another aspect, the first seal is configured to prevent fluid in the tappet bore from movement into the central bore of the barrel, the second seal is configured to prevent fluid in the central bore from movement into the tappet bore.

According to another aspect, the seal retainer housing has a first cylindrical wall that extends from a second cylindrical wall, the first cylindrical wall has a larger diameter than the diameter of the second cylindrical wall, the first cylindrical wall configured to receive and retain the proximal end of the barrel therein, the second cylindrical wall configured to receive and retain the first seal therein. According to a further aspect, the proximal end of the barrel is coupled to the first cylindrical wall by an interference fit.

According to another aspect, in a first condition the plunger is assembled with the annular seal assembly, wherein in a second condition the plunger assembled with the annular seal assembly is assembled with the proximal end of the barrel to assemble the plunger, the annular seal assembly, and the barrel together.

According to another aspect, the first seal includes a first lip seal spaced opposite a second lip seal. According to a further aspect, the first seal includes a first spring associated with the first lip seal, and the first seal includes a second spring associated with the second lip seal.

According to another aspect, the fuel pump further comprises a first coil spring having a proximal end opposite a distal end, wherein the proximal end is assembled with the plunger and the distal end is in contact with the annular seal assembly to urge the annular seal assembly towards the barrel; and a second coil spring having a proximal end opposite a distal end, wherein the distal end is retained on the barrel and the proximal end is in contact with a tappet assembly.

According to a third aspect, a fuel pump comprises a barrel having a longitudinal axis that spans between a proximal end and a distal end, the barrel including a central bore along the longitudinal axis; a plunger disposed at least partially in the central bore, the plunger configured to move along the longitudinal axis; an annular seal assembly coupled to and disposed around: a circumference of the distal end of the barrel, and a circumference of the plunger, to prevent mixing of fuel and oil; a first coil spring having a proximal end opposite a distal end, wherein the proximal end is assembled with the plunger and the distal end is in contact with the annular seal assembly to urge the annular seal assembly towards the barrel; and a second coil spring having a proximal end opposite a distal end, wherein the distal end is retained on the barrel and the proximal end is in contact with a tappet assembly.

According to another aspect, the annular seal assembly includes a seal retainer housing and a first seal configured to prevent fluid in the tappet bore from movement into the central bore of the barrel, the seal retainer housing is configured to retain the proximal end of the barrel thereon such that the proximal end of the barrel forms a second seal with the seal retainer housing to prevent fluid in the central bore from movement into the tappet bore.

According to another aspect, the seal retainer housing has a first cylindrical wall that extends from a second cylindrical wall, the first cylindrical wall has a larger diameter than the diameter of the second cylindrical wall, the first cylindrical wall configured to receive and retain the proximal end of the barrel therein, the second cylindrical wall configured to receive and retain the first seal therein. According to a further aspect, the proximal end of the barrel is coupled to the first cylindrical wall by an interference fit.

According to another aspect, the annular seal assembly is configured to be removed from the plunger and re-assembled with the plunger.

According to another aspect, the annular seal assembly includes a double lip seal, the double lip seal having two lips that cooperate with the plunger.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fuel pump comprising:
a barrel having a longitudinal axis that spans between a proximal end and a distal end, the barrel including a central bore along the longitudinal axis;
a plunger disposed at least partially in the central bore, the plunger configured to move along the longitudinal axis;
an annular seal assembly arranged around the circumference of the plunger, the annular seal assembly including a seal retainer housing and a first seal, the seal retainer housing contains the proximal end of the barrel therein such that the proximal end of the barrel forms a second seal with the seal retainer housing; and
a coil spring having a proximal end opposite a distal end, wherein the proximal end is assembled with the plunger and the distal end is assembled with the annular seal assembly to urge the annular seal assembly towards the barrel.

2. The fuel pump of claim 1, wherein the first seal is configured to prevent fluid in the tappet bore from movement into the central bore of the barrel, and the second seal is configured to prevent fluid in the central bore from movement into the tappet bore.

3. The fuel pump of claim 1, further comprising:
a second coil spring having a proximal end opposite a distal end, wherein the distal end is retained on the barrel.

4. The fuel pump of claim 1, wherein the annular seal assembly is configured to be removed from the plunger and re-assembled with the plunger.

5. The fuel pump of claim 1, wherein the seal retainer housing has a first cylindrical wall that extends from a second cylindrical wall, the first cylindrical wall has a larger diameter than the diameter of the second cylindrical wall, the first cylindrical wall is configured to receive and retain the proximal end of the barrel therein, and the second cylindrical wall is configured to receive and retain the first seal therein.

6. The fuel pump of claim 5, wherein the proximal end of the barrel is coupled to the first cylindrical wall by an interference fit.

7. The fuel pump of claim 1, wherein the first seal includes a first lip seal spaced opposite a second lip seal.

8. The fuel pump of claim 7, wherein the seal includes a first spring associated with the first lip seal, and the seal includes a second spring associated with the second lip seal.

9. The fuel pump of claim 1, wherein the first seal comprises a polytetrafluoroethylene material.

10. The fuel pump of claim 1, further comprising:
an elastomeric seal positioned between the proximal end of the barrel and the annular seal assembly.

11. A fuel pump comprising:
a barrel having a longitudinal axis that spans between a proximal end and a distal end, the barrel including a central bore along the longitudinal axis;
a plunger disposed at least partially in the central bore, the plunger configured to move along the longitudinal axis; and
an annular seal assembly arranged around the circumference of the plunger, the annular seal assembly including a seal retainer housing and a first seal, the proximal end of the barrel contained within the seal retainer housing such that the proximal end of the barrel forms a second seal with the seal retainer housing, the annular seal assembly is configured to be removed from the plunger and re-assembled with the plunger.

12. The fuel pump of claim 11, wherein the first seal is configured to prevent fluid in the tappet bore from movement into the central bore of the barrel, the second seal is configured to prevent fluid in the central bore from movement into the tappet bore.

13. The fuel pump of claim 11, wherein the seal retainer housing has a first cylindrical wall that extends from a second cylindrical wall, the first cylindrical wall has a larger diameter than the diameter of the second cylindrical wall, the first cylindrical wall configured to receive and retain the proximal end of the barrel therein, the second cylindrical wall configured to receive and retain the first seal therein.

14. The fuel pump of claim 13, wherein the proximal end of the barrel is coupled to the first cylindrical wall by an interference fit.

15. The fuel pump of claim 11, wherein in a first condition the plunger is assembled with the annular seal assembly, wherein in a second condition the plunger assembled with the annular seal assembly is assembled with the proximal end of the barrel to assemble the plunger, the annular seal assembly, and the barrel together.

16. The fuel pump of claim 11, wherein the first seal includes a first lip seal spaced opposite a second lip seal.

17. The fuel pump of claim 16, wherein the first seal includes a first spring associated with the first lip seal, and the first seal includes a second spring associated with the second lip seal.

18. The fuel pump of claim 11, further comprising:
a first coil spring having a proximal end opposite a distal end, wherein the proximal end is assembled with the plunger and the distal end is in contact with the annular seal assembly to urge the annular seal assembly towards the barrel; and
a second coil spring having a proximal end opposite a distal end, wherein the distal end is retained on the barrel and the proximal end is in contact with a tappet assembly.

19. A fuel pump comprising:
a barrel having a longitudinal axis that spans between a proximal end and a distal end, the barrel including a central bore along the longitudinal axis;
a plunger disposed at least partially in the central bore, the plunger configured to move along the longitudinal axis;
an annular seal assembly coupled to and disposed around:
(i) a circumference of the proximal end of the barrel to contain the proximal end of the barrel within the annular seal assembly, and
(ii) a circumference of the plunger,
to prevent mixing of fuel and oil;
a first coil spring having a proximal end opposite a distal end, wherein the proximal end is assembled with the plunger and the distal end is in contact with the annular seal assembly to urge the annular seal assembly towards the barrel; and
a second coil spring having a proximal end opposite a distal end, wherein the distal end is retained on the barrel and the proximal end is in contact with a tappet assembly.

20. The fuel pump of claim 19, wherein the annular seal assembly includes a seal retainer housing and a first seal configured to prevent fluid in the tappet bore from movement into the central bore of the barrel, the seal retainer housing is configured to retain the proximal end of the barrel thereon such that the proximal end of the barrel forms a second seal with the seal retainer housing to prevent fluid in the central bore from movement into the tappet bore.

21. The fuel pump of claim 20, wherein the seal retainer housing has a first cylindrical wall that extends from a second cylindrical wall, the first cylindrical wall has a larger diameter than the diameter of the second cylindrical wall, the first cylindrical wall configured to receive and retain the proximal end of the barrel therein, the second cylindrical wall configured to receive and retain the first seal therein.

22. The fuel pump of claim 21, wherein the proximal end of the barrel is coupled to the first cylindrical wall by an interference fit.

23. The fuel pump of claim 19, wherein the annular seal assembly is configured to be removed from the plunger and re-assembled with the plunger.

24. The fuel pump of claim 19, wherein the annular seal assembly includes a double lip seal, the double lip seal having two lips that cooperate with the plunger.

* * * * *